United States Patent [19]

Chun et al.

[11] Patent Number: 5,351,331
[45] Date of Patent: Sep. 27, 1994

[54] METHOD AND APPARATUS FOR SPLICING OPTICAL FIBERS WITH SIGNAL I/O

[75] Inventors: Christopher K. Y. Chun, Gilbert; Davis H. Hartman, Phoenix; Shun-Meen Kuo, Chandler; Michael S. Lebby, Apache Junction, all of Ariz.

[73] Assignee: Motorola, Inc., Schaumburg, Ill.

[21] Appl. No.: 122,673

[22] Filed: Sep. 17, 1993

[51] Int. Cl.$^5$ .......................... G02B 6/38; G02B 6/26; B65H 69/02

[52] U.S. Cl. .......................... 385/97; 385/24; 385/31; 385/89; 385/90; 385/91; 385/95; 385/98; 385/114; 385/136; 385/137; 156/158

[58] Field of Search .................. 385/95, 97, 99, 98, 385/135, 136, 137, 114, 83, 65, 59, 31, 24, 88, 89, 92; 156/158, 160, 166, 167, 178; 264/1.1, 1.5, 1.6, 2.7

[56] References Cited

U.S. PATENT DOCUMENTS

| | | | |
|---|---|---|---|
| 3,871,935 | 3/1975 | Gloge et al. | 385/97 X |
| 4,142,776 | 3/1979 | Cherin et al. | 385/59 X |
| 4,662,962 | 5/1987 | Malavieille | 385/83 X |
| 4,735,477 | 4/1988 | Bowen | 385/31 X |
| 4,753,515 | 6/1988 | Sato et al. | 385/59 X |
| 4,778,243 | 10/1988 | Finzel | 385/55 X |
| 4,969,705 | 11/1990 | Stoy et al. | 385/97 X |
| 5,018,821 | 5/1991 | Kurata | 385/95 X |
| 5,024,505 | 6/1991 | Junji et al. | 385/97 X |
| 5,159,653 | 10/1992 | Carpenter et al. | 385/95 |
| 5,170,456 | 12/1992 | Itoh et al. | 385/97 X |
| 5,189,717 | 2/1993 | Larson et al. | 385/95 |
| 5,222,172 | 6/1993 | Suzuki | 385/97 X |
| 5,257,334 | 10/1993 | Takahashi | 385/83 X |
| 5,259,050 | 11/1993 | Yamakawa et al. | 385/114 X |
| 5,274,724 | 12/1993 | Brehm et al. | 385/95 |

*Primary Examiner*—Brian Healy
*Attorney, Agent, or Firm*—Eugene A. Parsons

[57] ABSTRACT

A method of splicing a pair of optical fibers including, molding a base with a groove therein extending from a first inlet to a second inlet with a tapered portion at each inlet to act as a guide during the positioning of the fibers. Positioning the ends of the optical fibers in the inlets of the groove and introducing an index matching fluid into the groove. A cover having a hole therethrough may be positioned over the groove and the fluid introduced through the hole. The fluid is cured to hold the fibers fixedly in the groove and form an optical link therebetween. The cover may be molded with a perpendicular groove therein and photonic devices mounted in the cover groove.

10 Claims, 5 Drawing Sheets

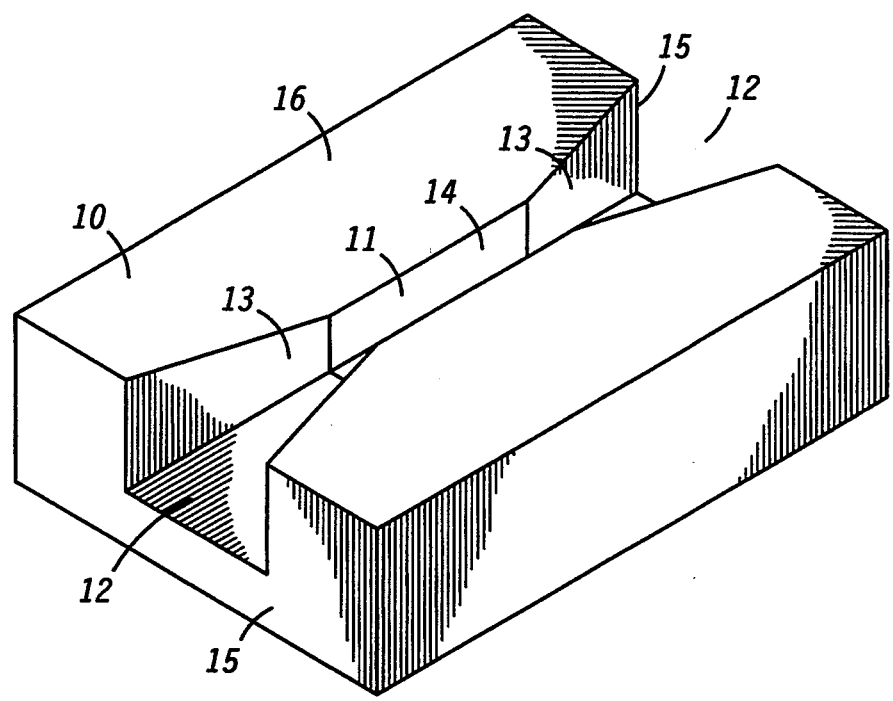
FIG. 1
FIG. 2
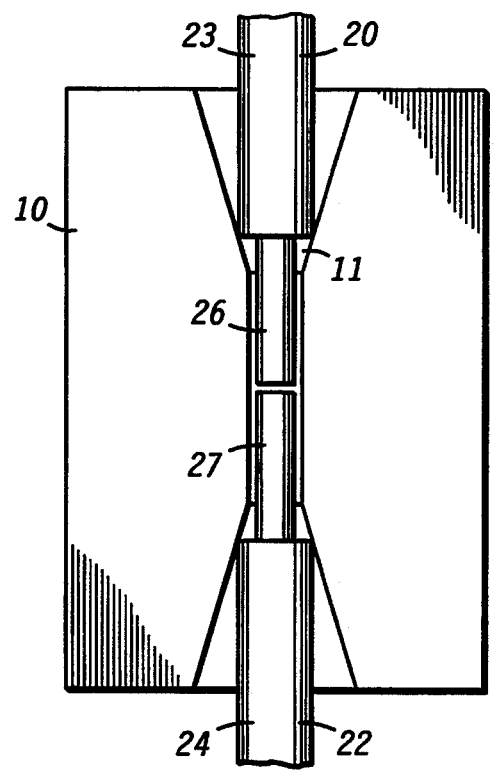

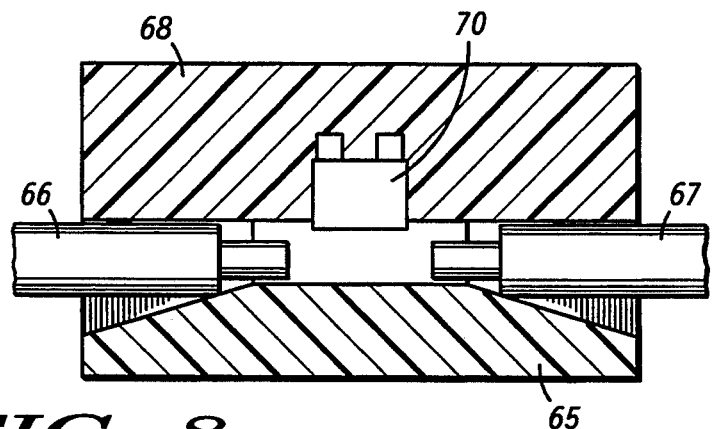
FIG. 8
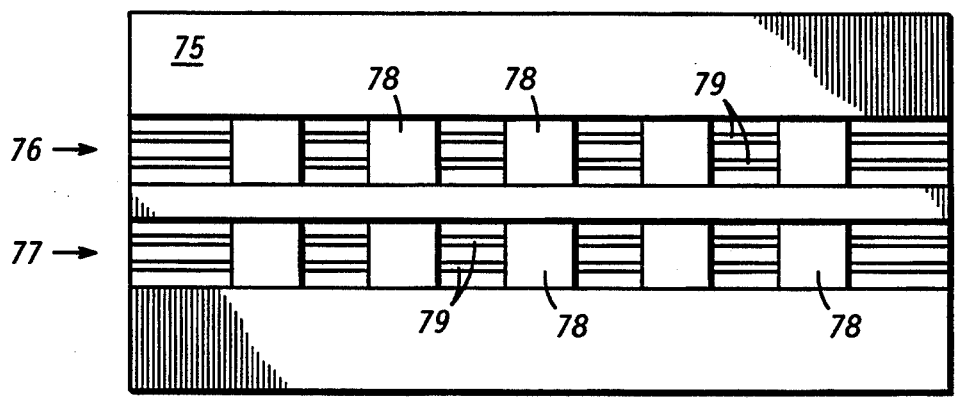
FIG. 9
FIG. 10
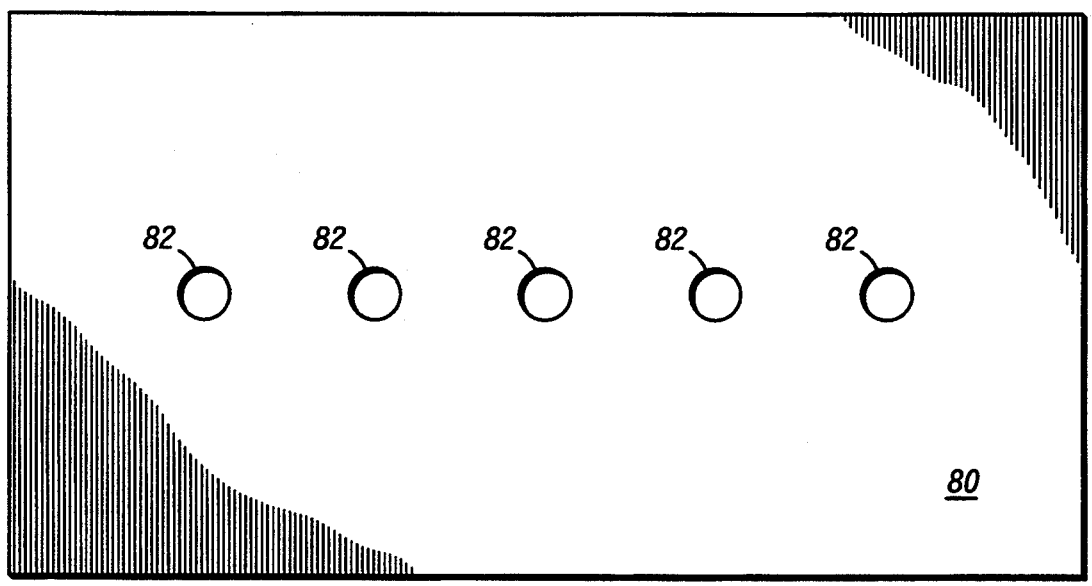

METHOD AND APPARATUS FOR SPLICING OPTICAL FIBERS WITH SIGNAL I/O

FIELD OF THE INVENTION

The present invention pertains to optical fibers and more specifically to joining optical fibers end-to-end in a continuous path.

BACKGROUND OF THE INVENTION

Fiber optic technology was, at its inception in the late 1960's, faced with the challenge of penetrating the electronics marketplace. When optical fiber loss was dramatically reduced to less than 1 db/Km in the late 1970's, the opportunity to begin to replace costly copper transmission lines with a single optical fiber emerged. Transmission of many telephone calls over long unrepeated distances could ultimately lead to significant reduction in a system's cost per channel-mile. Because telecommunication systems costs are driven largely by cable cost, the fiber solution could be implemented without regard to the cost of the electro-optic interfaces, installation and repair. A major consequence of this situation is the very high cost of manufacturing these interfaces, installation and repair equipment, even today.

The introduction of fiber optic communications into computer and other electronic systems has lagged far behind the usage fiber optics have seen in the telecommunications industries. This should not be surprising, since the cost-per channel mile figure of merit which originally drove fiber optics is not as important in the computer and electronic industry. Instead, computer and other electronic systems designs are driven by the need to produce low cost, high performance information processing systems, and installation and repair equipment. Hardware-related issues are mostly packaging and interconnect related. While these issues have always held high priority for computer and electronic equipment manufacturers, only recently have they taken a slightly different flavor. With the speed of microprocessors now rapidly being pushed into and beyond the 100 Mb/s region, it is becoming very difficult to separate the circuit design-fabrication issues from the packaging-interconnect issues. Instead, packages and their interconnections are an inseparable part of circuits.

Many methods have been developed for joining, or splicing, optical fibers for installation and repair. Also, many different types of apparatus are available for performing the splicing operations. Generally, the splicing methods are complicated and expensive and are not readily adaptable for use in the field. Most of the prior art apparatus is also very complicated and expensive to use. Further, most of the prior art devices for splicing fiber optics are relatively large and unwieldily to use in the field. These devices traditionally are not adaptable for use with other optical fiber splicing techniques.

Accordingly, it is a purpose of the present invention to provide a new and improved method of splicing optical fibers.

It is a further purpose of the present invention to provide a new and improved method of splicing optical fibers which is relatively simple and inexpensive to perform.

It is a still further purpose of the present invention to provide a new and improved method of splicing optical fibers which can conveniently be performed in the field without the need for burdensome and expensive equipment.

It is another purpose of the present invention to provide new and improved apparatus for use in splicing optical fibers.

It is still another purpose of the present invention to provide new and improved apparatus for use in splicing optical fibers which is simple and inexpensive to fabricate and to use.

SUMMARY OF THE INVENTION

The above problems are at least partially solved and the above purposes are realized in a method of splicing a pair of optical fibers including providing first and second optical fibers, each having an end to be spliced to the other, molding a base with a groove therein extending from a first fiber receiving inlet to a second fiber receiving inlet, positioning the ends of the first and second optical fibers in the fiber receiving inlets of the groove in the base, introducing an index matching fluid into the groove, and curing the fluid to hold the fibers fixedly in the groove and form an optical link therebetween.

The above problems are at least partially solved and the above purposes are further realized in apparatus for use in splicing a pair of optical fibers each having an end to be spliced to the other, including a molded base with a groove therein extending from a first fiber receiving inlet to a second fiber receiving inlet, the groove having a tapered portion at each of the first and second fiber receiving inlets to act as a guide during the positioning of the first and second ends of the optical fibers, each of the tapered portions being molded with a larger cross-section at an outer edge of the base and a smaller cross-section within the base.

BRIEF DESCRIPTION OF THE DRAWINGS

Referring to the drawings wherein like characters indicate like parts throughout the various figures:

FIG. 1 is a perspective view of apparatus for use in splicing a pair of optical fibers, embodying the present invention;

FIG. 2 is a view in top plan of the apparatus of FIG. 1 with a pair of optical fibers positioned therein;

FIGS. 7 and 8 are sectional views, similar to FIG. 5 of different embodiments; and FIGS. 9 and 10 are views in top plan of different embodiments of covers for use with the apparatus of FIG. 3.

DESCRIPTION OF THE PREFERRED EMBODIMENTS

Figure 3:
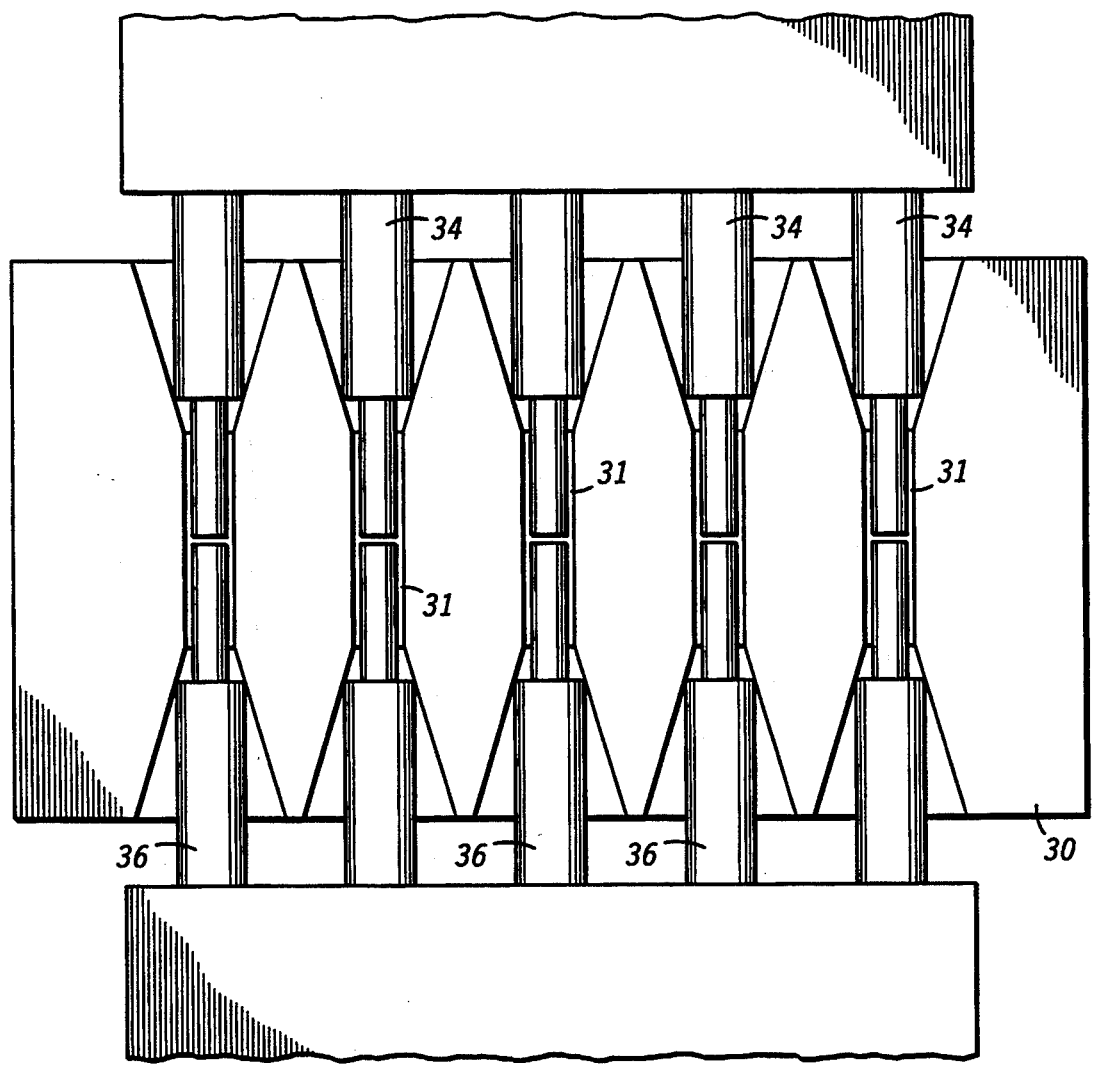
FIG. 3 is a view in top plan of a pair of fiber ribbons spliced together utilizing another embodiment of splicing apparatus and embodying the present invention.

Referring specifically to FIG. 1, apparatus for use in splicing a pair of optical fibers is illustrated. The apparatus includes a base 10 having a groove 11 formed therein. Groove 11 has a fiber receiving inlet 12 at each end thereof including a tapered portion 13 with a larger cross-section at an outer edge 15 of base 10 and a smaller cross-section within the base. It should be noted that all three sides of tapered portion 13 are tapered inwardly toward a central channel, or untapered portion, 14, while an upper surface 16 of base 10 is substantially flat. Tapered portion 13 acts as a guide during the positioning of ends of an optical fiber in central channel 14 of groove 11.

Generally, base 10 is fabricated by transfer molding, injection molding, compression molding, or the like to insure smooth surfaces on groove 11 and required dimensions. Referring to FIG. 2, a pair of optical fibers 20 and 22 are positioned in groove 11 of base 10. Optical fiber 20 has an outer protective coating designated 23 surrounding a glass cladding layer and glass optical core, hereinafter referred to as core 26. Optical fiber 22 has an outer protective coating designated 24 surrounding a glass cladding layer and glass optical core, hereinafter referred to as core 27. It can be seen in FIG. 2 that channel 14 of groove 11 is only slightly larger than the cores 26 and 27 of optical fibers 20 and 22. Since the outside diameters (glass cladding layer and optical core) for single mode optical fibers and for multi-mode optical fibers are both approximately the same size (i.e., 125 microns), the cross-section of channel 14 of groove 11 ranges from approximately 125 microns along each side to a few microns larger. Further, tapered portions 13 of groove 11 taper from relatively large inlets 12 (hundreds of microns) to the same size as channel 14 of groove 11. These features are most easily realized by the molding techniques described.

While virtually any molding material can be utilized in the embodiments described in FIGS. 1–3, typically, a molding compound for use in the present molding method is made of an optically transparent material, such as epoxies, plastics, polyimides, or the like. Generally, refractive indexes of these optically transparent materials range from 1.48 to 1.54. Processing conditions for these materials range from 22 degrees Celsius to 200 degrees Celsius for molding temperatures and 200 pounds per square inch to 2,000 pounds per square inch for molding pressures. By injecting the molding material into a molding cavity, intricacies of the surface of base 10 are transferred to the molding compound. A subsequent curing process solidifies the molding compound, thereby permanently transferring the intricacies or a negative image of the surface to the solidified molding compound in the cavity.

Groove 11 is illustrated as having a rectangular crossection; however, other geometric configurations may be made, such as U-grooves, semicircles, V-grooves, or the like. While groove 11 is illustrated as being of a size to allow the ends of cores 26 and 27 to be positioned in substantially abutting engagement, it will be understood that in some applications groove 11 will be constructed much longer so that when it is filled with an appropriate material (to be described) an optical waveguide is formed to provide communication between optical fibers 20 and 22. At least in such applications, groove 11 is made in such a manner so as to produce smooth defect free surfaces. Also, it should be understood by one skilled in the art that by molding groove 11 smooth defect free surfaces are achieved at a minimal cost.

Generally, base 10 forms a cladding layer for cores 26 and 27 and any space therebetween. A cover, not shown, can be provided with base 10 and affixed over groove 11 to completely surround groove 11 with a cladding layer. Here it should be noted that a cover may not be required if the ends of cores 26 and 27 are placed in abutting engagement, but a cover adds additional strength and protection to the splice. Further, while base 10 and the cover are discussed separately hereinabove, it should be understood that they typically are made together as part of a whole mold. By molding base 10 and the cover together several advantages are realized, such as facilitating robotic removal and subsequent robotic processing of base 10 and the cover, and injection of the molding compound is the same, thus producing similar or equal refractive indexes in base 10 and the cover.

In one embodiment, a small drop of fluid is injected into channel 14 of groove 11 at the junction of cores 26 and 27 to provide a continuous optical path. This drop of fluid and additional or different adhesive material may also be injected to hold optical fibers 20 and 22 in groove 11. Also, if a cover is utilized the cover and base 10 will generally be joined by the same material. In one embodiment, groove 11 is simply filled with an optically transparent material with an index of refraction that matches the index of refraction of cores 26 and 27. Typically, base 10 and the cover are Joined by an optically transparent material which forms the core of a waveguide and acts as an adhesive or an optically transparent polymer. The optically transparent adhesive generally may be any of several materials, such as epoxies, plastics, polyimides, or the like. Generally, refractive indexes of these optically transparent materials range from 1.54 to 1.58.

It should be understood that to form an optical waveguide the refractive index of the core must be at least 0.01 greater than that refractive index of cladding layers surrounding the core. In one embodiment, when a cover is utilized with base 10, application of the optically transparent adhesive is done in such a manner as to completely fill channel 14 of groove 11, thereby forming a waveguide core between the ends of cores 26 and 27 of optical fibers 20 and 22. By having channel 14 of groove 11 (the waveguide core) completely surrounded by base 10 and the cover, the core has superior performance characteristics for conducting light or light signals. Additionally, a capability is available to match the refractive indexes of base 10 and the cover.

Typically, the optically transparent adhesive utilized to optically join cores 26 and 27 is cured by a variety of methods, such as air drying, exposure to UV light, heat treating, or the like. Selection of specific curing methods is application specific as well as being dependent upon selection of adhesive and cladding materials that are used for making base 10 and the cover (if used).

Referring specifically to FIG. 3, a base 30 having a plurality of grooves 31 is illustrated. Each groove 31 in base 30 is formed substantially as described with respect to Groove 11 in FIG. 1. Base 30 is utilized to form a splice between a first optical fiber ribbon 33, including a plurality of optical fibers 34, and a second optical fiber ribbon 35, including a plurality of optical fibers 36. Optical fibers 34 are separated and the protection layer of each fiber is partially stripped to expose a portion of the core. Optical fibers 34 and 36 are then inserted into grooves 31, using the tapered inlets as a guide, generally as explained above with relation to FIG. 2. With the cores substantially in abutting relationship an index matching fluid is injected at each splice, after which the index matching fluid is cured to fixedly join optical fibers 34 and 36 of optical fiber ribbons 33 and 35.

Figure 4:
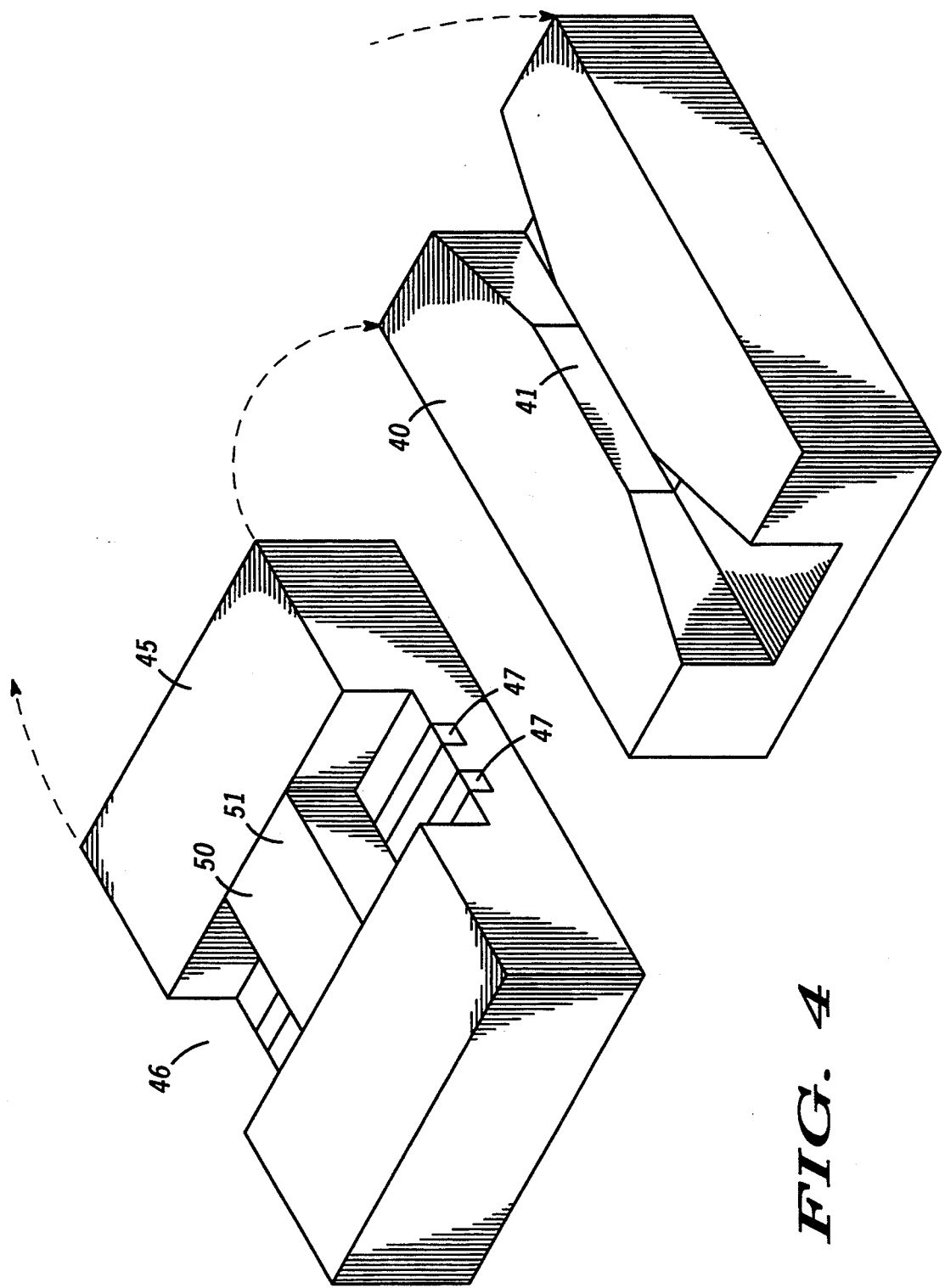
FIG. 4 is an exploded view, portions thereof rotated ninety degrees, of another embodiment of apparatus for use in splicing a pair of optical fibers and forming an I/O junction therebetween.

Referring specifically to FIG. 4, a base 40, similar to base 10 of FIG. 1, is molded with a channel 41 formed therein, as previously described. A mating cover 45 is molded with base 40, also as previously described. In this embodiment, cover 45 is molded with a groove 46 extending from side-to-side generally perpendicular to groove 41 in base 40. Groove 46 in cover 45 has at least one (in this embodiment two) electrically conductive track 47 or lead molded into the lower surface thereof. A photonic device 50, which may be for example a light generating device or a light detecting device, is mounted in groove 46 so that a working area or surface 51 is substantially flush with the upper edges of groove 46. Electrical terminals of photonic device 50 are electrically connected to tracks 47 so that electrical connections can be made to photonic device 50 through tracks 47. It should be noted that tracks 47 can either be accessible along the sides of cover 45, cover 45 can extend outwardly along at least one side beyond the side of base 40 to make a portion of groove 46 accessible, or the tracks can extend to a portion of cover 45 that is easily accessible.

Figure 5:
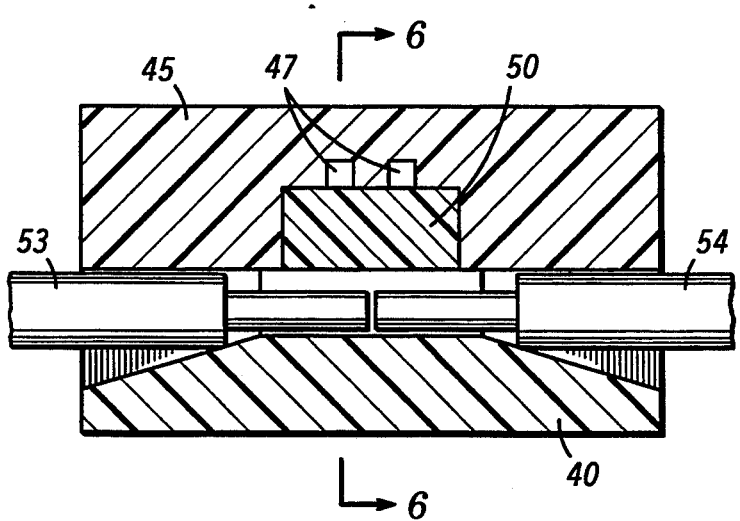
FIG. 5 is a sectional view of a pair of optical fibers spliced with apparatus similar to that illustrated in FIG. 4.
Figure 6:
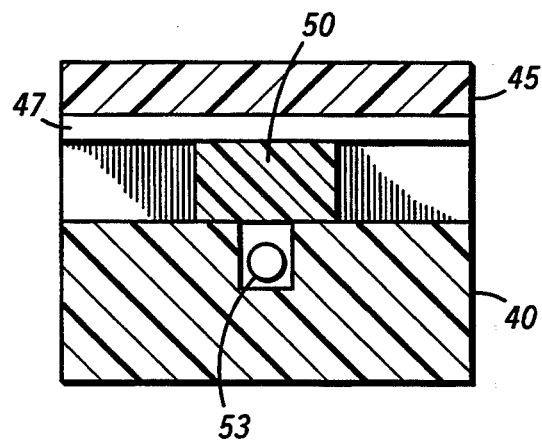
FIG. 6 is a cross-sectional view as seen from the line 6—6 of FIG. 5.

A pair of optical fibers 53 and 54 are placed in groove 41 and cover 45 is positioned over base 40, as previously described. A sectional view of the assembled structure is illustrated in FIG. 5. A cross-sectional view as seen from the line 6—6 in FIG. 5 is illustrated in FIG. 6. With cover 45 matingly affixed to base 40, photonic device 50 overlies groove 41 in base 40 and the junction of the ends of optical fibers 53 and 54. If photonic device 50 is, for example, a photodetector there will generally be some light loss at the junction which the photodetector will easily detect. If there is insufficient light loss for adequate detection the ends of optical fibers 53 and 54 can be separated slightly to increase the light loss sufficiently for good detection. Generally, the separation necessary for good light detection will be less than a half wavelength of the light being transmitted.

Figure 7:
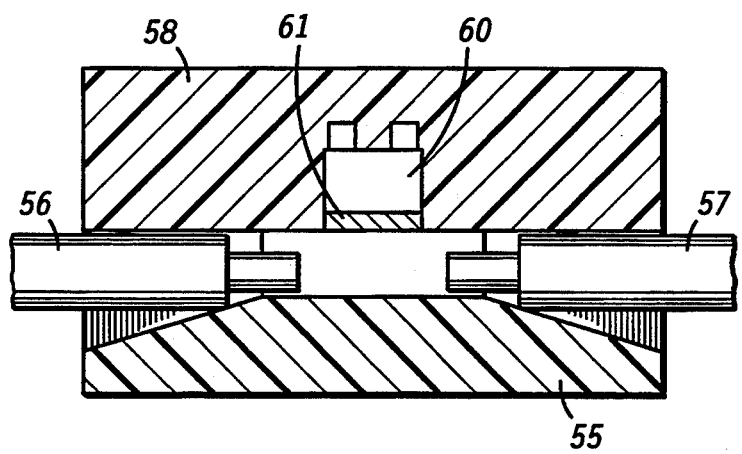

Another embodiment, similar to the assembled structure illustrated in FIG. 6, is illustrated in FIG. 7. In this embodiment a base 55 has a pair of optical fibers 56 and 57 fixed therein and a cover 58 engaged thereover, as previously described. The ends of optical fibers 56 and 57 are separated and the space therebetween is filled with an optically transparent material selected to form an optical waveguide. In the embodiment of FIG. 7 a vertical cavity surface emitting laser (VCSEL) 60 is mounted on a diffractive grating 61 constructed to deflect light emanating from VCSEL 60 into the ends of one or both of optical fibers 56 and 57. This deflection can be directly into the ends of optical fibers 56 and 57 at an angle less than the critical acceptance angle of the fibers, or the light can bounce one or more times from the walls of the optical waveguide formed between the ends and then enter the fibers at less than the critical acceptance angle.

Another embodiment, similar to the structures illustrated in FIGS. 6 and 7, is illustrated in FIG. 8. In this embodiment a base 65 has a pair of optical fibers 66 and 67 fixed therein and a cover 68 engaged thereover, as previously described. The ends of optical fibers 66 and 67 are separated and the space therebetween is filled with an optically transparent material selected to form an optical waveguide. In the embodiment of FIG. 8 an edge emitting laser 70 is mounted so that the emitting edge extends into the groove in base 65. Light emanating from edge emitting laser 70 either enters the ends of one or both of optical fibers 66 and 67 directly or on a bounce from the sides of the waveguide formed therebetween.

Referring specifically to FIG. 9, a cover 75 having a pair of grooves 76 and 77 molded therein is illustrated. Cover 75 is designed to mate with base 30 of FIG. 3 and each of the grooves 76 and 77 have photonic devices 78 mounted therein and electrically attached to electrically conducting tracks 79 molded into the surface of grooves 76 and 77. There are a total of ten photonic devices 78 which are positioned in five pairs with each pair positioned over a different groove 31, each containing one of the splices in optical fibers 34. The pair of photonic devices can be any desired combination of devices, such as a light detector and a light generator. Further, while all of the devices in groove 76 are connected in parallel and all of the devices in groove 77 are connected in parallel, it will be understood that more electrically conducting tracks could be utilized for individual activation or an addressing scheme could be utilized.

Referring specifically to FIG. 10, a cover 80 is illustrated having a plurality (5) of holes 82 formed therethrough. Cover 80 is designed to mate with a base similar to base 30 in FIG. 3. Holes 82 are positioned to directly overlie the abutted ends of optical fibers 34 in grooves 31 when cover 80 is matingly engaged over base 30. In this specific embodiment, optical fibers 34 are positioned within grooves 31, as illustrated in FIG. 3, and cover 80 is matingly engaged with base 30. It will of course be understood that in some applications it may be convenient to engage cover 80 with base 30 first and then insert optical fibers 34 into grooves 31. One or more drops of an index matching fluid is injected into each of the splices by means of holes 82. The index matching fluid is then cured to complete the splice and, in some applications hold cover 80 fixedly in place.

By way of example only, base 30 and a matching cover (75 or 80) are made by injecting a transparent epoxy molding compound, available under the Tradename HYSOL MG18 from Dexter Corporation, into molds. Temperature of the molds ranges between 150° C. to 175° C. with a preferred temperature range from 160 degrees Celsius to 165 degrees Celsius. Molding pressure of the molds ranges between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, base 30 and the cover are removed from the molds. Typically, a postcuring step is necessary in order to achieve maximum physical and electrical properties of the HYSOL material. This step generally proceeds at 150 degrees Celsius for approximately 2 to 4 hours. Completion of the postcure step results in base 30 and the cover having a refractive index of approximately 1.52.

Once the molding and curing processes, as well as the removal of base 30 and the cover from their respective molds have been completed, they are ready to be assembled. Assembly is achieved by applying an optically clear adhesive with a refractive index at least 0.01 higher than the the refractive index of base 30 and the cover to surface grooves 31 and the abutting surfaces. In a preferred embodiment of the present invention, these requirements are fulfilled by applying an optically clear epoxy available under a Tradename EPO-TEK 301-2 from EPOXY TECHNOLOGY INC. Typically, after the adhesive is applied to grooves 31 and the upper surface of base 30, the cover is compressed against the surface of base 30, thereby squeezing and filling grooves 31 and adhering both base 30 and the cover together. Curing times for the optically transparent adhesive is dependent upon temperature, e.g., at room temperature curing time is 2 days and at 80 degrees Celsius curing time is 1.5 hours.

Thus, a new and improved method of splicing optical fibers is disclosed which is relatively simple and inexpensive to perform. Further, a new and improved method of splicing optical fibers is disclosed which can conveniently be performed in the field without the need for burdensome and expensive equipment. Also, new and improved apparatus for use in splicing optical fibers is disclosed which is simple and inexpensive to fabricate and to use. In addition to new and improved methods and apparatus for splicing optical fibers, new and improved methods and apparatus for fabricating I/O junctions is disclosed.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A method of splicing a pair of optical fibers comprising the steps of:
    providing first and second optical fibers, each having an end to be spliced to the other;
    molding a base with a groove therein extending from a first fiber receiving inlet to a second fiber receiving inlet;
    positioning the end of the first optical fiber in the first fiber receiving inlet of the groove in the base;
    positioning the end of the second optical fiber in the second fiber receiving inlet of the groove in the base;
    introducing an index matching fluid into the groove;
    curing the fluid to hold the fibers fixedly in the groove and form an optical link therebetween; and
    providing a cover having a groove formed therein which, when the cover is placed in sealing engagement over the groove in the base, is positioned perpendicular to the groove in the base and a photonic device positioned in the groove in the cover, and fixedly positioning the cover in sealing engagement over the groove in the base.

2. A method of splicing a pair of optical fibers as claimed in claim 1 wherein the step of providing a cover includes providing a cover having an electrically conductive track positioned in the groove in the cover and electrically connected to the photonic device positioned in the groove in the cover.

3. A method of splicing first and second optical fiber ribbons, each including a plurality of optical fibers, comprising the steps of:
    providing first and second optical fiber ribbons, each having a ribbon end with the plurality of fibers being separated into separate fiber ends to be spliced to other fiber ends;
    molding a base with a plurality of grooves therein, each groove extending from a first fiber receiving inlet to a second fiber receiving inlet, and further molding each of the plurality of grooves with a tapered portion at each of the first and second receiving inlets to act as a guide during the positioning of the first and second ends, each of the tapered portions being molded with a larger cross-section at an outer edge of the base and a smaller cross-section within the base;
    positioning the fiber ends of the plurality of optical fibers in the first fiber ribbon, one each, in the first fiber receiving inlet of the plurality of grooves in the base utilizing the tapered portions as a guide;
    positioning the fiber ends of the plurality of optical fibers in the second fiber ribbon, one each, in the second fiber receiving inlets of the plurality of grooves in the base utilizing the tapered portions as a guide;
    introducing an index matching fluid into the plurality of grooves;
    curing the fluid to hold the fibers fixedly in the grooves and form optical links therebetween; and
    providing a cover having a groove formed therein which, when the cover is placed in sealing engagement over the groove in the base, is positioned perpendicular to the groove in the base and a photonic device positioned in the groove in the cover, and fixedly positioning the cover in sealing engagement over the plurality of grooves in the base.

4. A method of splicing a pair of optical fibers as claimed in claim 3 wherein the step of providing a cover includes providing a cover having an electrically conductive track positioned in the groove in the cover and electrically connected to the photonic device positioned in the groove in the cover.

5. Apparatus for splicing a pair of optical fibers each having an end to be spliced to the other, comprising a molded base with a groove therein extending from a first fiber receiving inlet to a second fiber receiving inlet, the groove having a tapered portion at each of the first and second fiber receiving inlets to act as a guide during the positioning of the first and second ends of the optical fibers, each of the tapered portions being molded with a larger cross-section at an outer edge of the base and a smaller cross-section within the base; and a matching cover molded to abuttingly engage the base so as to seal the groove in the base with optical fibers engaged in the groove in the base, the cover includes a groove formed therein generally perpendicular to the groove in the base and a photonic device mounted in the groove in the cover so as to overlie a portion of the groove in the base when the cover is sealingly engaged with the base.

6. A pair of spliced optical fibers comprising:
    first and second optical fibers, each having an end to be spliced to the other;
    a molded base with a groove therein extending from a first fiber receiving inlet to a second fiber receiving inlet, the groove in the base including a tapered portion at each of the first and second receiving inlets to act as a guide during the positioning of the first and second ends, each of the tapered portions having a larger cross-section at an outer edge of the base and a smaller cross-section within the base;
    the end of the first optical fiber being positioned in the first fiber receiving inlet of the groove in the base and the end of the second optical fiber being positioned in the second fiber receiving inlet of the groove in the base;

introducing an index matching fluid into the groove; and curing the fluid to hold the fibers fixedly in the groove and form an optical link therebetween; and a cover fixedly positioned in sealing engagement over the groove in the base, the cover including a groove formed therein which, when the cover is placed in sealing engagement over the groove in the base, is positioned perpendicular to the groove in the base and a photonic device positioned in the groove in the cover.

7. A pair of spliced optical fibers as claimed in claim 6, wherein the cover further includes an electrically conductive track positioned in the groove in the cover and electrically connected to the photonic device positioned in the groove in the cover.

8. A pair of spliced optical fibers as claimed in claim 6 wherein the photonic device is a light emitting diode.

9. A pair of spliced optical fibers as claimed in claim 6 wherein the photonic device is a vertical cavity surface emitting laser and a diffractive grating is positioned in the groove in the cover so as to direct light from the vertical cavity surface emitting laser into the groove in the base.

10. A pair of spliced optical fibers as claimed in claim 6 wherein the photonic device is an edge emitting laser with the emitting edge extending out of the groove in the cover and into the groove in the base so as to direct light emitted by the edge emitting laser into the groove in the base.

* * * * *